United States Patent
Joo et al.

(10) Patent No.: US 11,025,160 B2
(45) Date of Patent: Jun. 1, 2021

(54) POWER CONVERSION APPARATUS AND METHOD, AND ELECTRONIC APPARATUS USING SAME APPARATUS

(71) Applicant: SAMSUNG ELECTRONICS CO., LTD., Suwon-si (KR)

(72) Inventors: Sung Yong Joo, Hwaseong-si (KR); Yong Joo Lee, Suwon-si (KR); Ka San Ha, Goyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/493,440

(22) PCT Filed: Mar. 16, 2018

(86) PCT No.: PCT/KR2018/003110
§ 371 (c)(1),
(2) Date: Sep. 12, 2019

(87) PCT Pub. No.: WO2018/203597
PCT Pub. Date: Nov. 8, 2018

(65) Prior Publication Data
US 2020/0136500 A1 Apr. 30, 2020

(30) Foreign Application Priority Data

May 2, 2017 (KR) .......................... 10-2017-0056124

(51) Int. Cl.
*H02M 1/42* (2007.01)
*H02M 3/335* (2006.01)
(Continued)

(52) U.S. Cl.
CPC ......... *H02M 1/4208* (2013.01); *H02M 3/335* (2013.01); *H05B 33/08* (2013.01);
(Continued)

(58) Field of Classification Search
CPC .......... H02M 1/4208; H02M 3/33569; H02M 3/33507; H02M 2001/0032; H02M 2001/0058
See application file for complete search history.

(56) References Cited

U.S. PATENT DOCUMENTS 8,076,920 B1 * 12/2011 Melanson ............. H02M 3/005
323/299
8,213,135 B2   7/2012 Kim et al.
(Continued)

FOREIGN PATENT DOCUMENTS

KR     10-0904299       6/2009
KR     10-2012-0097274  9/2012
(Continued)

OTHER PUBLICATIONS

International Search Report for PCT/KR2018/003110, with English translation, dated Jul. 4, 2018, 5 pages.
(Continued)

*Primary Examiner* — Kyle J Moody
*Assistant Examiner* — Lakaisha Jackson
(74) *Attorney, Agent, or Firm* — Nixon & Vanderhye, P.C.

(57) ABSTRACT

A power conversion device includes a rectifying circuit that full-wave rectifies an input AC power, a first conversion circuit that includes a passive element, a first switching element, and a second switching element and digitally converts a rectified power while compensating a power factor of the rectified power through at least one of the passive element, the first switching element, and the second switching element, a second conversion circuit that converts the digitally-converted power into a power with a specified magnitude and output the power with the specified magnitude, a device circuit that consumes an output power of the second conversion circuit, a first control circuit that moni-
(Continued)

tors current consumption of the device circuit and controls an amount of output current of the second conversion circuit based on the current consumption of the device circuit, and a second control circuit that controls a power factor compensation degree of the first conversion circuit based on the current consumption, wherein the second control circuit may alternately activate the first and second switching elements according to the current consumption or deactivate the second switching element and switch the first switching element.

11 Claims, 10 Drawing Sheets

(51) Int. Cl.
  *H05B 33/08* (2020.01)
  *H02M 1/00* (2006.01)
(52) U.S. Cl.
  CPC .... *H02M 3/33507* (2013.01); *H02M 3/33569* (2013.01); *H02M 2001/0032* (2013.01); *H02M 2001/0058* (2013.01)

(56) References Cited

U.S. PATENT DOCUMENTS

| | | |
|---|---|---|
| 8,248,040 B2 | 8/2012 | Rausch et al. |
| 8,723,487 B2 | 5/2014 | Pahlevaninezhad et al. |
| 9,048,749 B2 | 6/2015 | Joo et al. |
| 9,112,420 B2 | 8/2015 | Kim et al. |
| 9,190,909 B2 | 11/2015 | Chen et al. |
| 9,931,951 B2 | 4/2018 | Khaligh et al. |
| 2009/0168475 A1* | 7/2009 | Hirosawa ............ H02M 3/1584 363/84 |
| 2009/0295347 A1* | 12/2009 | Popescu ............ H02M 3/1584 323/272 |
| 2010/0110593 A1 | 5/2010 | Kim et al. |
| 2011/0001362 A1* | 1/2011 | de Groot ............ H02M 3/1584 307/80 |
| 2011/0025289 A1* | 2/2011 | Wang ................. H02M 3/3387 323/285 |
| 2011/0110132 A1 | 5/2011 | Rausch et al. |
| 2012/0049994 A1 | 3/2012 | Joo et al. |
| 2013/0119932 A1 | 5/2013 | Moon et al. |
| 2013/0148384 A1 | 6/2013 | Kim et al. |
| 2013/0235631 A1 | 9/2013 | Pahlevaninezhad et al. |
| 2014/0055057 A1 | 2/2014 | Kim et al. |
| 2014/0334196 A1 | 11/2014 | Chen et al. |
| 2014/0368742 A1 | 12/2014 | Joo et al. |
| 2016/0016479 A1 | 1/2016 | Khaligh et al. |
| 2018/0222333 A1 | 8/2018 | Khaligh et al. |

FOREIGN PATENT DOCUMENTS

| | | |
|---|---|---|
| KR | 10-2014-0100673 | 8/2014 |
| KR | 10-2014-0144886 | 12/2014 |
| KR | 10-1528636 | 6/2015 |

OTHER PUBLICATIONS

Written Opinion of the ISA for PCT/KR2018/003110, dated Jul. 4, 2018, 7 pages.

* cited by examiner

POWER CONVERSION APPARATUS AND METHOD, AND ELECTRONIC APPARATUS USING SAME APPARATUS

This application is the U.S. national phase of International Application No. PCT/KR2018/003110 filed 16 Mar. 2018, which designated the U.S. and claims priority to KR Patent Application No. 10-2017-0056124 filed 2 May 2017, the entire contents of each of which are hereby incorporated by reference.

TECHNICAL FIELD

Embodiments disclosed herein relate to a device for converting an AC power into a DC power.

BACKGROUND ART

An electronic device using an AC power may include a device for utilizing power efficiently. For example, the electronic device may include a power factor correction (PFC) circuit that compensates the power factor of an input power.

The PFC circuit may include a passive PFC circuit implemented only with passive elements and an active PFC circuit implemented with a combination of passive elements and active elements. The passive PFC circuit may have a problem that the size and implementation cost of a passive element including at least one of a capacitor and an inductor may increase according to a load size. An electronic device may include an active PFC circuit to reduce the size and implementation cost of passive elements. The active PFC circuit involves switching control during driving, thus leading to larger current consumption as compared to a passive PFC circuit.

DISCLOSURE

Technical Problem

The electronic device may need to reduce a standby power when the electronic device is not powered on although an AC power is applied thereto. To this end, the electronic device may turn off (deactivate) the active PFC circuit in a standby mode and drive the active PFC circuit after a user's power-on request. In this case, the electronic device may generate a power for driving a display after the power-on request, which may take more time than expected by the user.

Various embodiments disclosed herein may provide a power conversion device and method capable of shortening a power-on time and an electronic device to which the power conversion device is applied.

Technical Solution

A power conversion device according to an embodiment disclosed in the disclosure includes a rectifying circuit that full-wave rectifies an input AC power, a first conversion circuit that includes a passive element, a first switching element, and a second switching element and digitally converts a rectified power while compensating a power factor of the rectified power through at least one of the passive element, the first switching element, and the second switching element, a second conversion circuit that converts the digitally-converted power into a power with a specified magnitude and output the power with the specified magnitude, a device circuit that consumes an output power of the second conversion circuit, a first control circuit that monitors current consumption of the device circuit and controls an amount of output current of the second conversion circuit based on the current consumption of the device circuit, and a second control circuit that controls a power factor compensation degree of the first conversion circuit based on the current consumption, wherein the second control circuit may alternately activate the first and second switching elements according to the current consumption or deactivate the second switching element and switch the first switching element.

An electronic device according to an embodiment disclosed in the disclosure includes a power conversion device, wherein the device circuit includes a plurality of light emitting devices (LEDs), and a processor that controls activation and deactivation of the plurality of LEDs, and wherein the power conversion device compensates a power factor using at least one of the passive element and the first switching element in a mode in which the plurality of LEDs are deactivated.

A power conversion method by at least one processor according to an embodiment disclosed in the disclosure includes monitoring current consumption of a device circuit that consumes a power generated by digitally converting an AC power when the power is applied, and controlling a power factor compensation degree of a power factor compensation circuit that compensates a power factor for the AC power according to the monitored current consumption, wherein the controlling of the power factor compensation degree includes alternately activating a plurality of switching elements included in the power factor compensation circuit according to the current consumption or deactivating one of the plurality of switching elements and switching remaining switching elements.

Advantageous Effects

According to various embodiments of the disclosure, a time required for powering on the power converter may be shortened. In addition, various effects may be provided that are directly or indirectly understood through the disclosure.

DESCRIPTION OF DRAWINGS

In the description of the drawings, the same or similar reference numerals may be used for the same or similar components.

MODE FOR INVENTION

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. The singular form of a noun corresponding to one item may include the one item or a plurality of items, unless the context clearly indicates otherwise. In the disclosure, the expressions "A or B", "at least one of A and B", "at least one of A or B", "A, B or C", "at least one of A, B and C" and "at least one of A, B or C" may include all possible combinations of items listed together in the corresponding one of the expressions. Terms such as "first" or "second" may be used merely to distinguish a component from other corresponding components, and to separate the components from other aspects (e.g., importance or order). When one (e.g., first) component may be referred to as being "coupled" or "connected" to another (e.g., second) component, with or without the term "operatively" or "communicatively", it means that the one component may be connected directly to the another component (e.g., by wire), wirelessly, or via a third component.

Figure 1:
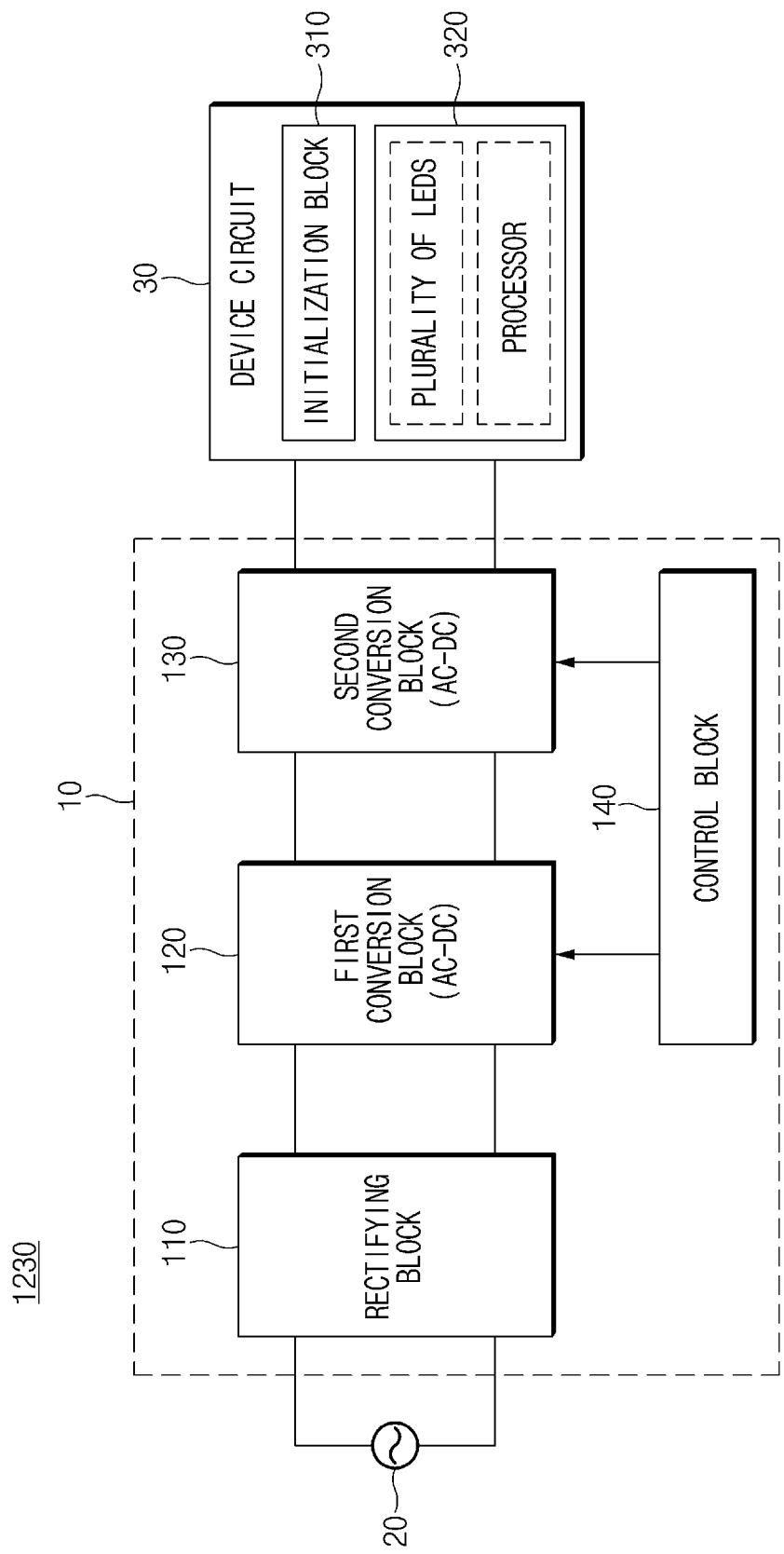
FIG. 1 is a configuration diagram illustrating an electronic device according to various embodiments.

FIG. 1 is a configuration diagram illustrating an electronic device according to an embodiment.

Referring to FIG. 1, an electronic device 1230 according to an embodiment may include a device circuit 30, a power interface circuit 20, and a power conversion module 10. For example, the electronic device 1230 may include at least one of, for example, a TV, a monitor, a notebook, a large format display (LFD), a tablet personal computer (PC), a desktop PC, a laptop PC, a netbook computer, an electronic picture frame and a lighting device. The electronic device 1230 may be a device that digitally converts an AC power to be used as a driving power and includes at least one LED that is turned on during driving.

According to an embodiment, the device circuit 30 may include circuits that respectively perform and provide functions of the electronic device 1230. For example, the device circuit 30 may include an initialization block 310 and a main block 320.

The initialization block 310 may receive or detect a power-on signal through an input module (or an input device or an input circuit). The input module may include at least one of a communication unit (or communication circuit) that communicates with a remote control device having a power on key and a power-on button provided in the electronic device 1230. The power on signal may be, for example, a signal received or detected according to manipulation of the power on key or a power on button.

When receiving or detecting the power on signal from the input module, the initialization block 310 may transmit a signal for powering on the main block 320. The initialization block 310 may be driven in a standby mode or an active mode of the electronic device 1230.

The main block 320 may be a block for driving a main function of the electronic device 1230 (e.g., a function requiring LED lighting or a display function). The main block may include at least one of, for example, an LED and a processor. The LED may be turned on using the output power of the power conversion module 10. The processor may activate and deactivate the LED. The main block may further include a display. When the display is further included, the LED may be a backlight of the display. The main block 320 may be deactivated (e.g., turned off) in the standby mode of the electronic device 1230, and activated (e.g., turned on) in the active mode of the electronic device 1230.

According to an embodiment, when the power interface circuit 20 may be electrically connected to an external power source, the power interface circuit 20 may receive a power from the external power source. For example, the power interface circuit 20 may include a power plug, a power cable, and the like.

According to an embodiment, the power conversion module 10 may output a power by digitally converting an AC power. The power conversion module 10 may compensate the power factor of the AC power. An output power of the power conversion module 10 may be classified into a first power supplied to the initialization block 310 and a second power supplied to the main block 320. At least one of the first power or the second power may be fed back to at least one of a first conversion block 120, a second conversion block 130, and a control block 140. For example, at least a part of current consumption of the device circuit 30 may be fed back to at least one of the first conversion block 120, the second conversion block 130, and the control block 140.

According to an embodiment, the power conversion module 10 may include a rectifying block 110, the first conversion block 120, the second conversion block 130, and a control block 140.

When an AC power is input, the rectifying block 110 may perform full-wave rectification on the AC power. For example, the rectifying block 110 may include a bridge full-wave rectifying circuit.

The first conversion block 120 may digitally convert the rectified power while compensating the power factor of the rectified power. For example, the first conversion block 120 may be an interleaved power factor correction circuit. The interleaved power factor correction circuit may include a passive element and a plurality of switching elements (active elements), and may compensate the power factor of rectified power by alternately switching the plurality of switching elements. The interleaved power factor correction circuit may be, for example, a continuous conduction mode (CCM) interleaved PFC circuit or a discontinuous conduction mode (CRM) interleaved PFC circuit.

A switching element of the first conversion block 120 may be deactivated initially when a rectified power is applied. For example, when the rectified power is initially applied, the first conversion block 120 may compensate the power factor using only a passive element. As another example, the first conversion block 120 may be switched based on current consumption after the current consumption (or power consumption) of the device circuit 30 is fed back. In this case, after the consumption current is fed back, the first conversion block 120 may compensate the power factor by using a passive element and an active element. At least one of the switching and switching frequency of the first conversion block 120 may be determined based on the current consumption of the device circuit 30. The first conversion block 120 may be controlled by the control block 140.

The second conversion block 130 may output a power by stepping down the digitally-converted power. When the digitally-converted power is received from the first conversion block 120, the second conversion block 130 may convert the received power into a power of a specified magnitude and output the power of the specified magnitude.

The amount of an output current of the second conversion block 130 may be adjusted based on the current consumption of the device circuit 30. The second conversion block 130 may be controlled by the control block 140.

The second conversion block 130 may be configured to isolate the primary side from the secondary side. For example, the second conversion block 130 may include a half bridge LLC resonant converter or flyback converter including at least one transformer, or the like.

The control block 140 may control at least one of the first conversion block 120 and the second conversion block 130. For example, the control block 140 may monitor the current consumption of the device circuit 30 and control at least one of the first conversion block 120 and the second conversion block 130 according to the monitored current consumption.

The control block 140 may increase or decrease the amount of an output current of the second conversion block 130 according to the monitored current consumption. For example, when the monitored current consumption increases, the control block 140 may decrease a switching frequency of a switching element included in the second conversion block 130 to increase the amount of the output current of the second conversion block 130. When the switching frequency is decreased, a transfer time of energy transferred from the primary side to the secondary side of the second conversion block 130 may increase, thereby leading to an increase in the amount of output current. For example, when the monitored current consumption decreases, the control block 140 may increase a switching frequency of a switching element included in the second conversion block 130 to decrease the amount of the output current of the second conversion block 130.

In one embodiment, the control block 140 may adjust a power factor compensation degree by the first conversion block 120 according to the current consumption of the device circuit 30. The control block 140 may indirectly identify the current consumption of the device circuit 30 based on a primary input current of the second conversion block 130 or a primary output current of the second conversion block 130 and adjust the power factor compensation degree by the first conversion block 120 based on the identified current consumption of the device circuit 30. For example, when the current consumption decreases, the control block 140 may decrease the number of switching elements switched among the plurality of switching elements included in the second conversion block 130. As another example, when the current consumption decreases, the control block 140 may decrease a switching frequency of a switching element that is switched among the plurality of switching elements. As still another example, the control block 140 may perform a process opposite to that in a case where the current consumption decreases when the current consumption increases.

The control block 140 may include a plurality of hardware blocks. For example, the control block 140 may include a control circuit (e.g., 149) that controls the first conversion block 120, a control circuit (e.g., 145) that controls the second conversion block 130, or a feedback circuit (e.g., 141 or 147) that monitors the current consumption of the device circuit 30.

According to an embodiment, the power conversion module 10 may control switching for power factor compensation and adjustment of output current based on power consumption from the device circuit 30. Accordingly, the power conversion module 10 according to an embodiment may output a power corresponding to an operation state (e.g., standby mode or active mode) of the electronic device 1230 without receiving a power-on request from the device circuit 30.

Figure 2A:
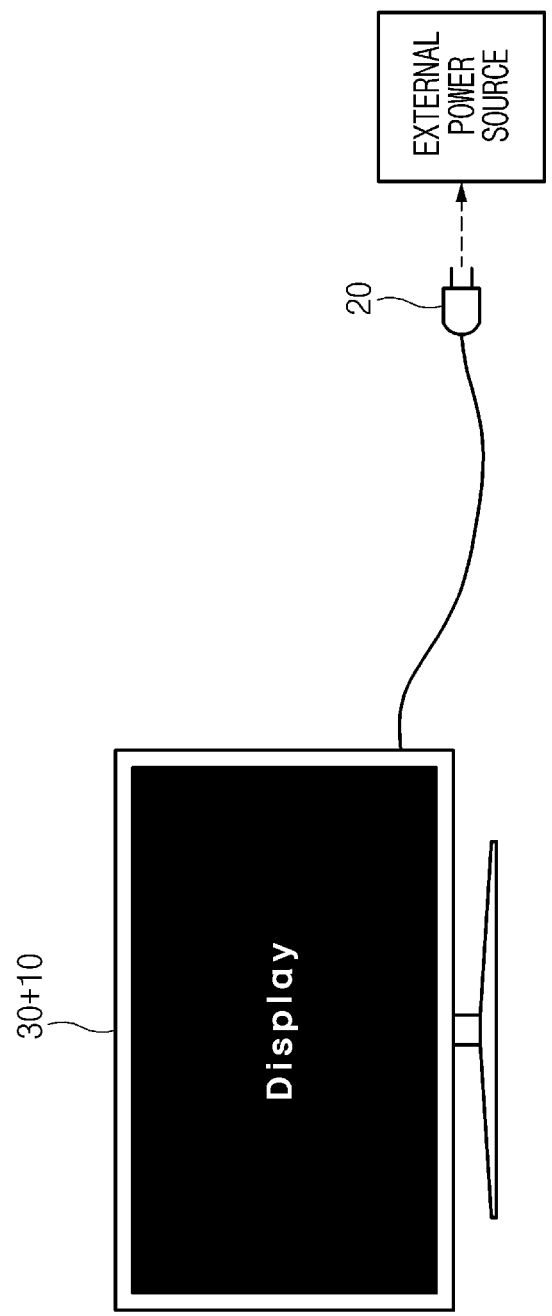
FIG. 2A is an example of an implementation of an electronic device according to a first embodiment.

FIG. 2A is an example of an implementation of an electronic device according to an embodiment. FIG. 2A illustrates an example in which the electronic device is a display device.

Referring to FIG. 2A, the device circuit 30 according to an embodiment may be integrated with the power conversion module 10.

The power conversion module 10 may be included in a first housing of the electronic device 1230. The device circuit 30 may be included in the first housing or in a second housing mechanically coupled with the first housing. In this case, the device circuit 30 and the power conversion module 10 may be connected to each other via a cable included in the first housing or the second housing of the electronic device 1230, a pattern of a printed circuit board, a connector, or the like.

Figure 2B:
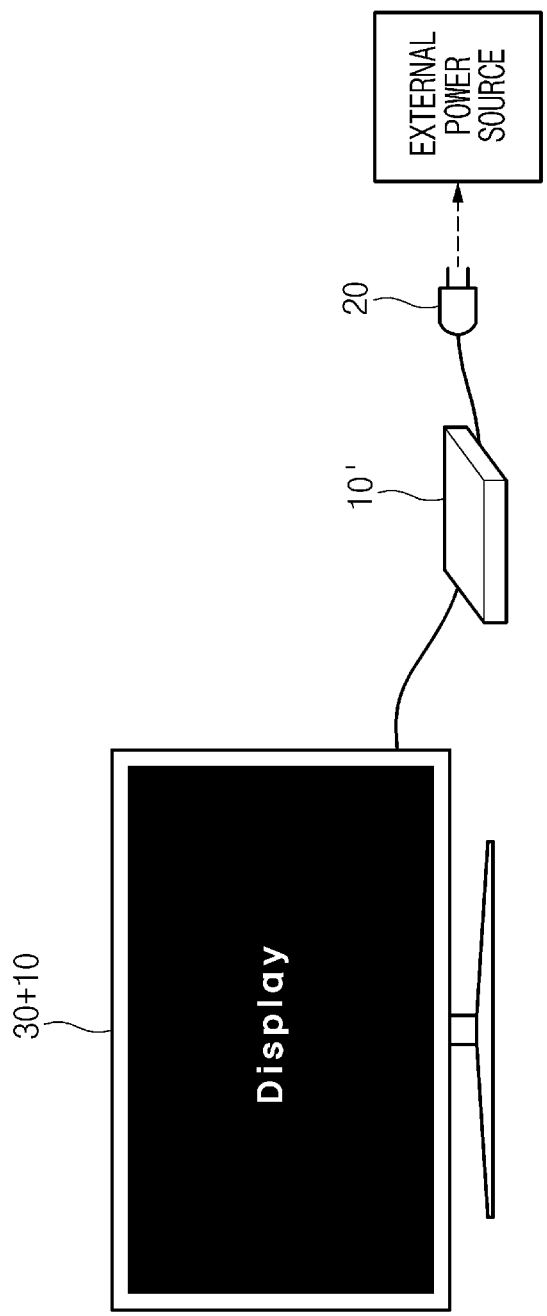
FIG. 2B is an example of an implementation of an electronic device according to a second embodiment.

FIG. 2B is another example of an implementation of an electronic device according to an embodiment.

Referring to FIG. 2B, the device circuit 30 according to an embodiment may be provided in a housing spaced apart from the power conversion module 10, and may be electrically connected or disconnected to/from the power conversion module 10 through an external cable and an external connector. For example, the power conversion module 10 may be included in a housing of an external power adapter 10'. The device circuit 30 may be included in a housing of the electronic device 1230. In this case, the power conversion module 10 and the device circuit 30 may be electrically connected through an external cable and a connector. The external cable and the connector may include a positive (+) line and a negative (−) line which correspond to a driving power output from the power conversion module 10 and supplied to the device circuit 30.

The power conversion module 10 does not need to receive a power-on signal from the device circuit 30, and therefore, it is possible to simplify electrical connection between the external power adapter 10' and the electronic device 1230.

Figure 3:
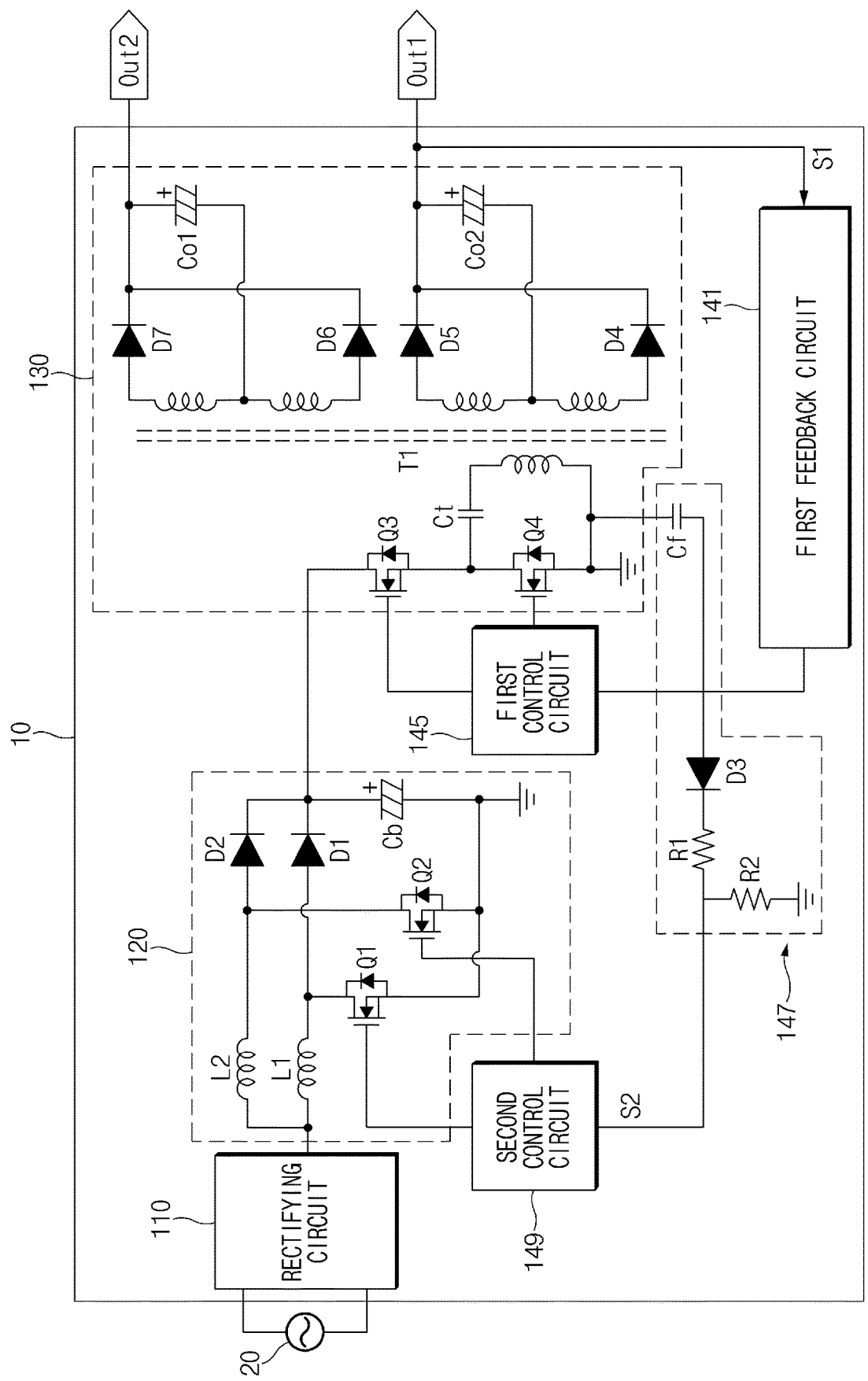
FIG. 3 is a circuit diagram of a power conversion module according to various embodiments.

FIG. 3 is a circuit diagram of an example of a power conversion module according to an embodiment.

Referring to FIG. 3, the power conversion module 10 according to an embodiment may include the rectifying block 110, the first conversion block 120, the second conversion block 130, and the control block 140. The control block 140 may include a first feedback circuit 141, a first control circuit 145, a second feedback circuit 147, and a second control circuit 149.

According to an embodiment, when an AC power is input, the rectifying block 110 may full-wave rectify the AC power. For example, the rectifying block 110 may be a bridge full-wave rectifying circuit.

According to an embodiment, the first conversion block 120 may digitally convert the rectified power while compensating the power factor of the rectified power. The first conversion block 120 may be divided into a first power factor compensation unit L1, D1, and Q1 and a second power factor compensation unit L2, D2, and Q2, each of which compensates a power factor of the rectified power, and a smoothing circuit Cb. The first and second power factor compensation units L1, L2, D1, D2, Q1, and Q2 may be connected to each other in parallel between an output terminal of the rectifying block 110 and an input terminal of the smoothing circuit Cb. The first and second power factor compensation units L1, L2, D1, D2, Q1, and Q2 may be activated in various forms. For example, the first power factor compensation unit L1, D1, and Q1 and the second power factor compensation unit L2, D2, and Q2 may be alternately activated. In this case, activation periods of the first and second power factor compensation units L1, L2, D1, D2, Q1, and Q2 may be set not to overlap each other by 50% or more. As another example, one of the first power factor compensation unit L1, D1, and Q1 and the second power factor compensation unit L2, D2, and Q2 may be activated alone. As still another example, at least one of a duty ratio and a switching frequency of at least one of the first power factor compensation unit L1, D1, and Q1 and the second power factor compensation unit L2, D2, and Q2 may be adjusted. As still another example, both of the first power factor compensation unit L1, D1, and Q1 and the second power factor compensation unit L2, D2, and Q2 may be deactivated.

In one embodiment, the first power factor compensation unit L1, D1, and Q1 may include the first inductor L1, the first diode D1, and the first switching element Q1.

One end of the first inductor L1 may be electrically connected to an output of the rectifying block 110, and the other end of the first inductor L1 may be electrically connected to one end of the first diode D1 and the first switching element Q1. An inductance of the first inductor L1 may be determined experimentally according to the characteristics of the power.

One end of the first diode D1 may be electrically connected to the other end of the first inductor L1 and one end of the first switching element Q1, and the other end of the first diode D1 may be connected to the smoothing circuit Cb. The first diode D1 may conduct a current flowing from the first inductor L1 to the smoothing circuit Cb and block a current flowing from the smoothing circuit Cb to the first inductor.

One end of the first switching element Q1 may be electrically connected between the first inductor L1 and the first diode D1, and the other end of the first switching element Q1 may be electrically connected to the ground. The first switching element Q1 may be switched (e.g., repeatedly activated and deactivated) under the control of the second control circuit 149 to adjust the amount of a current output from the first inductor L1. The first switching element Q1 may be deactivated in a standby mode of the electronic device 1230 and may be activated intermittently. As described above, the first power factor compensation unit L1, D1, and Q1 may compensate the power factor of the rectified power by adjusting the amount of current charged in the first inductor L1 as energy and then discharged.

In one embodiment, the second power factor compensation unit L2, D2, and Q2 may include the second inductor L2, the second diode D2, and the second switching element Q2.

One end of the second inductor L2 may be electrically connected to an output of the rectifying block 110, and the other end of the second inductor L2 may be electrically connected to one end of the second switching element Q2 and the second diode D2. An inductance of the second inductor L2 may be experimentally determined according to the characteristics of an input power.

One end of the second diode D2 may be electrically connected to the other end of the second inductor L2 and one end of the second switching element Q2, and the other end of the second diode D2 may be connected to the smoothing circuit Cb. The second diode D2 may conduct a current flowing from the second inductor L2 to the smoothing circuit Cb and block a current flowing from the smoothing circuit Cb to the second inductor.

One end of the second switching element Q2 may be electrically connected between the second inductor L2 and the second diode D2, and the other end of the second switching element Q2 may be electrically connected to the ground. The second switching element Q2 may be switched under the control of the second control circuit 149 to adjust the amount of current output from the second inductor L2. The second switching element Q2 may be in a deactivated state in the standby mode of the electronic device 1230. As described above, the second power factor compensation unit L2, D2, and Q2 may compensate the power factor of the rectified power by adjusting the amount of current that is charged in the second inductor L2 as energy and then discharged.

According to an embodiment, the second conversion block 130 may output a driving power by stepping down a digitally-converted power. The amount of current output from the second conversion block 130 may be adjusted based on the current consumption of the device circuit 30. The second conversion block 130 may include, for example, a half bridge LLC resonant converter, a flyback converter, and the like.

The second conversion block 130 may include a third switching element Q3, a fourth switching element Q4, a transformer T1, a second capacitor Ct, and a rectifying unit D4, D5, D6, D7, Co1, and Co2.

The third and fourth switching elements Q3 and Q4 may be activated to output the digitally-converted power, or may be deactivated not to output the digitally-converted power.

The third and fourth switching elements Q3 and Q4 may be repeatedly activated and deactivated under the control of the first control circuit 145. Switching frequencies of the third and fourth switching elements Q3 and Q4 may be related with the amount of output current of the second conversion block 130.

The transformer T1 may step down a primary-side power of the transformer T1 which has passed through the third and fourth switching elements Q3 and Q4 and the second capacitor Ct to output the same to the secondary side. The stepped-down power may be supplied to the device circuit 30 through the rectifying unit D4, D5, D6, D7, Co1, and Co2 electrically connected to the secondary side of the transformer T1.

The second capacitor Ct may block zero current when the third and fourth switching elements Q3 and Q4 are turned on or off, together with the transformer T1 (e.g., the primary winding of the transformer). The second capacitor Ct may prevent zero current loss due to repetition of activation and deactivation of the third and fourth switching elements Q3 and Q4 together with the transformer T1. For example, the second capacitor Ct may prevent zero current loss by resonating in a zero current section in a switching period of activation and deactivation of the third and fourth switching elements Q3 and Q4, in conjunction with the transformer T1.

The rectifying unit D4, D5, D6, D7, Co1, and Co2 may rectify and smooth the secondary power of the transformer T1 and transfer the smoothed power to the device circuit 30.

According to an embodiment, the first feedback circuit 141 may output a first feedback signal corresponding to the power consumption of the device circuit 30. For example, when the first feedback circuit 141 receives a first signal s1 corresponding to the current consumption of the device circuit 30, the first feedback circuit 141 may output the first feedback signal corresponding to the current consumption, which is electrically isolated from the first signal. The first feedback circuit 141 may include a constant voltage circuit (e.g., TL431) that outputs a first current corresponding to the first signal when receiving the first signal, and a photo coupler that outputs a second current (the first feedback signal) corresponding to the first current, which is electrically isolated from the first current.

According to an embodiment, the first control circuit 145 may control the amount of output current of the second conversion block 130 based on the first feedback signal. For example, when the current consumption of the device circuit 30 becomes large (or when the amount of output current of the second conversion block 130 is insufficient), the first control circuit 145 may decrease the switching frequencies of the third and fourth switching elements Q3 and Q4 included in the second conversion block 130. When the current consumption of the device circuit 30 becomes small (or when the amount of output current of the second conversion block 130 is sufficient), the first control circuit 145 may increase the switching frequencies of the third and fourth switching elements Q3 and Q4 included in the second conversion block 130. Accordingly, according to an embodiment, the first control circuit 145 may control the second conversion block 130 such that the second conversion block 130 outputs a power capable of sufficiently covering the current consumption of the device circuit 30.

According to an embodiment, the second feedback circuit 147 may output a first voltage corresponding to the primary-side output signal of the second conversion block 130. The second feedback circuit 147 may include a first capacitor Cf, a third diode D3, a first resistor R1, and a second resistor R2. The first capacitor Cf may be electrically connected to the primary output terminal (e.g., the primary side of the transformer) of the second conversion block 130 to remove the DC component from the output signal of the second conversion block 130. The third diode D3 may conduct the output of the positive current from the primary current which has passed through the first capacitor Cf and block the output of the negative current. The first resistor R1 and the second resistor R2 may enable voltage division of a signal passed through the third diode D3. The first and second resistors R1 and R2 may output a first voltage through division of the signal passed through the third diode D3 in a ratio of the resistances of the first resistor R1 and the second resistor R2.

According to an embodiment, the second control circuit 149 may identify the current consumption of the device circuit 30 based on the second feedback signal. The second control circuit 149 may determine which of first to fourth conditions the current consumption meets, and may control a power factor compensation degree by the first conversion block 120 in response to the met condition. The second control circuit 149 may control the first conversion block 120 such that the power factor compensation degree of the first conversion block 120 increases as the current consumption of the device circuit 30 increases.

In one embodiment, the second control circuit 149 may determine whether the current consumption of the device circuit 30 meets the first condition. The first condition may, for example, be a condition that the current consumption exceeds a first threshold. For example, the first threshold may be determined to correspond to a current consumption according to the execution of a first function in the active mode of the electronic device 1230. For example, the first threshold may be determined to be less than the lowest value of the current consumption according to the execution of the first function. The first function may be a function requiring LED lighting. The first function may be a function involving image output through a display.

When the current consumption of the device circuit 30 meets the first condition, the second control circuit 149 may drive the first conversion block 120 in a first mode. For example, the second control circuit 149 may alternately activate the first and second switching elements Q1 and Q2 in accordance with a first switching frequency and a first duty ratio in the first mode. In this case, the first conversion block 120 may compensate the power factor with a first efficiency that is highest.

In one embodiment, the second control circuit 149 may determine whether the current consumption meets the second condition. The second condition may be, for example, a condition that, the current consumption is less than or equal to the first threshold and exceeds a second threshold. The second threshold may be determined to be less than or equal to a current consumption according to execution of a second function in the active mode of the electronic device 1230 and exceed a current consumption in the standby mode of the electronic device 1230. The second function may be, for example, a function performed in the off state of the LED and the display (e.g., a music playback function).

The second control circuit 149 may drive the first conversion block 120 in a second mode when the current consumption satisfies the second condition. The second control circuit 149 may compensate the power factor by activating the first switching element Q1 in accordance with a second switching frequency and a second duty ratio in the second mode. For example, the second switching frequency may be less than, for example, the first switching frequency and exceed a third switching frequency. The second duty ratio (deactivation time/activation time) may be, for example, one. The second duty ratio may be greater than the first duty ratio, for example. The second control circuit 149 may deactivate the second switching element Q2 when the current consumption meets the second condition. In this case, the first conversion block 120 may compensate the power factor of the power with a second efficiency that is second highest.

The second control circuit 149 may determine whether the current consumption meets a third condition. The third condition may be, for example, a condition that a duration for which the current consumption is kept less than or equal to the second threshold is less than a threshold time.

The second control circuit 149 may drive the first conversion block 120 in the third mode when the current consumption meets the third condition. For example, the second control circuit 149 may decrease the activation time of the first switching element Q1 than that in a case where the current consumption meets the second condition. For example, the second control circuit 149 may activate the first switching element Q1 in accordance with a third switching frequency and a third duty ratio. The third switching frequency may be less than the second switching frequency. The third duty ratio (deactivation time/activation time) may be, for example, a value less than one. The third switching frequency and the third duty ratio may be set to satisfy the condition of a standby power of the electronic device 1230. In this case, the first conversion block 120 may compensate the power factor with a third efficiency that is third highest. As described above, the second control circuit 149 may periodically drive the first switching element Q1 included in the first conversion block 120 even in the standby mode of the electronic device 1230. In contrast, the second control circuit 149 may control the first switching element Q1 to be deactivated in the standby mode of the electronic device 1230. According to various embodiments, when the current consumption meets a fourth condition, the second control circuit 149 may drive the first conversion block 120 in a fourth mode. For example, the second control circuit 149 may deactivate both the first and second switching elements Q1 and Q2 in the fourth mode. The fourth condition may be, for example, a condition that a duration for which the current consumption of the device circuit 30 is kept less than or equal to the second threshold is greater than or equal to a threshold time. The first conversion block 120 may compensate the power factor with a fourth efficiency that is lowest in the fourth mode. To this end, the second control circuit 149 may further include a timer, and may measure a duration for which the current consumption meets the third condition.

In the above-described embodiment, the description is given by taking, as an example, a case where the second control circuit 149 determines the third mode and the fourth mode of the first conversion block 120 based on a duration for which the current consumption is kept in a state of meeting the third condition. However, unlike this, the second control circuit 149 may determine the third mode and the fourth mode of the first conversion block 120 using only the current consumption. For example, the standby mode of the electronic device 1230 may be classified into a first standby mode with a relatively high power consumption and a second standby mode with a relatively small power consumption. In this case, when the current consumption is less than or equal to the second threshold and exceeds the third threshold, the second control circuit 149 may control the first conversion block 120 in the third mode. On the other hand, when the current consumption is less than or equal to the third threshold, the second control circuit 149 may control the first conversion block 120 in the fourth mode.

In the above-described embodiment, a case in which the second control circuit 149 controls the first conversion block 120 in the first to fourth modes has been described as an example. However, in contrast, the second control circuit 149 may control the first conversion block 120 in the first to third modes according to a primary current of the second conversion block 130. Alternatively, the second control circuit 149 may control the first conversion block 120 in the first mode, the second mode, and the fourth mode. For example, whether the second control circuit 149 controls the first conversion block 120 in the first to third modes or in the first mode, the second mode, and the fourth mode, may be determined according to the standby current spec of the electronic device 1230.

The second control circuit 149 may control the switching frequency (frequency) of the first conversion block 120 to be out of an audible frequency band. Thus, according to the embodiment, it is possible to prevent switching noise of the first conversion block 120 from grating upon a user's ear.

As described above, according to the embodiment, the power conversion module 10 itself may adjust the output power and the power factor compensation degree for the output power based on the current consumption without the intervention of a main circuit (e.g., processor) of the electronic device.

Figure 4:
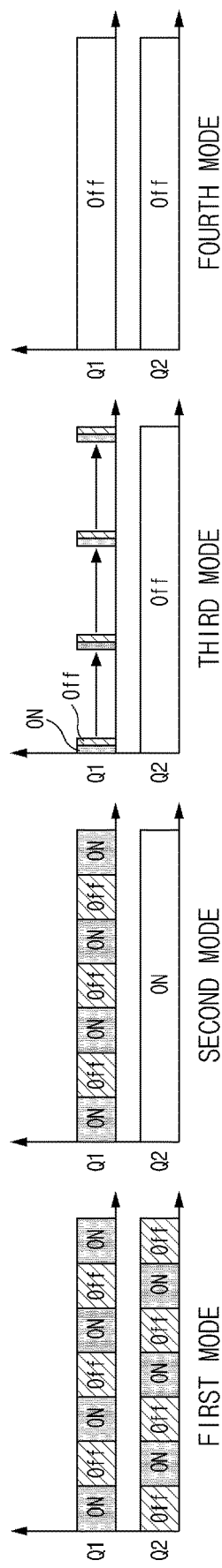
FIG. 4 is a graph illustrating switching frequencies of first and second switching elements according to various embodiments.

FIG. 4 is a graph illustrating switching frequencies of first and second switching elements according to an embodiment.

Referring to FIG. 4, as in the first mode, the second control circuit 149 may alternately activate the first and second switching elements Q1 and Q2 when the current consumption of the device circuit 30 meets the first condition.

As in the second mode, the second control circuit 149 may deactivate the second switching element Q2 and repeatedly activate (e.g., turn on) and deactivate (e.g., turn off) the first switching element Q1 when the current consumption of the device circuit 30 meets the second condition.

As in the third mode, the second control circuit 149 may further decrease the activation time of the first switching element Q1 and further increase the deactivation time of the first switching element Q1 when the current consumption of the device circuit 30 meets the third condition. The third mode may be a part of the standby mode of the electronic device 1230.

As in the fourth mode, the second control circuit 149 may deactivate both the first and second switching elements Q1 and Q2 when the current consumption of the device circuit 30 meets the fourth condition. The fourth mode may be performed in the standby mode of the electronic device 1230.

According to various embodiments, the third condition and the fourth condition may further include a duration for which the third mode is maintained. For example, when the duration for which the third mode is maintained is less than the threshold time, the second control circuit 149 may control the first conversion block 120 in the third mode. For another example, when the duration for which the third mode is maintained is greater than or equal to the threshold time, the second control circuit 149 may control the first conversion block 120 in the fourth mode.

In an embodiment, it is possible to control the amount of current supplied to the device circuit 30 and a power factor compensation degree using at least one of the first and second feedback signals corresponding to the current consumption of the device circuit 30, instead of receiving a control signal from the device circuit 30. Accordingly, in the embodiment, the power factor compensation efficiency may be further enhanced while satisfying the condition of the current consumption of the electronic device.

In one embodiment, a power factor by an active element (e.g., at least one of Q1 and Q2) may be compensated in advance in the standby mode, thereby reducing time required for a power-on sequence according to the power-on request of a user.

Figure 5:
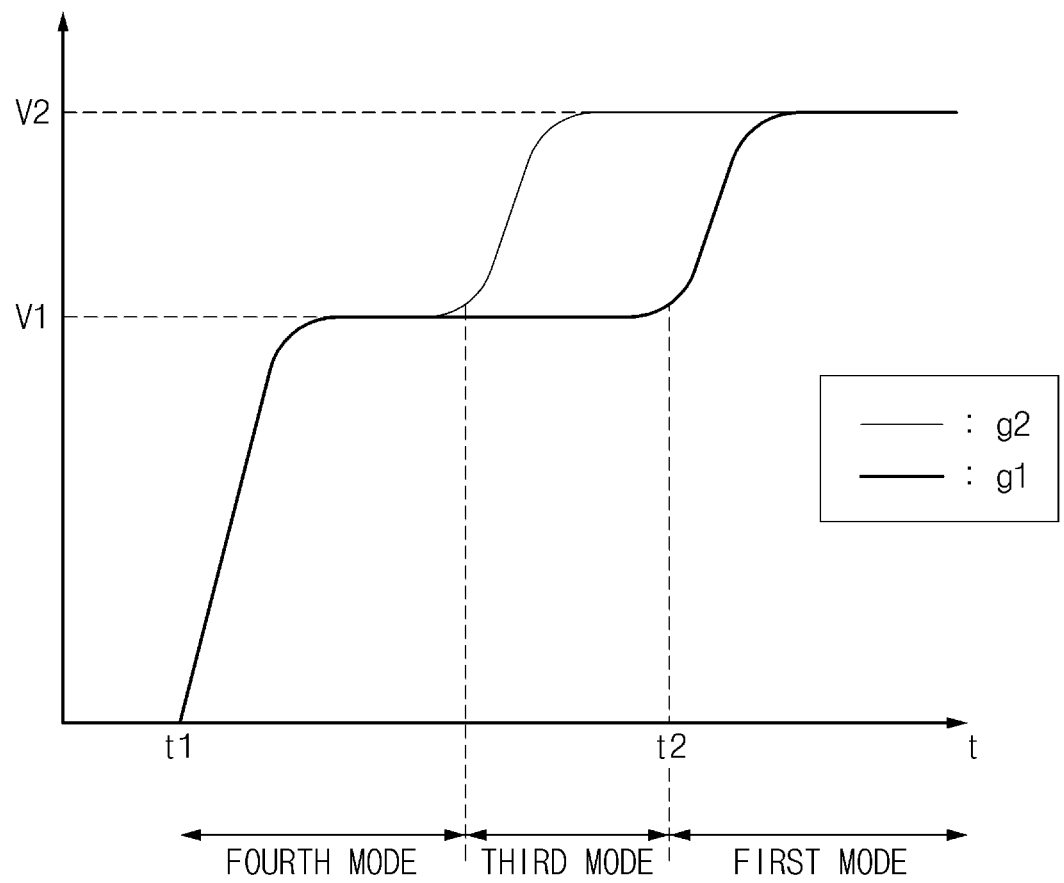
FIG. 5 is a graph illustrating an output of a power conversion module according to various embodiments.

FIG. 5 is a graph illustrating an output of a power conversion module according to an embodiment in comparison with a conventional power conversion module.

Referring to FIG. 5, as illustrated in a first graph g1, a conventional power conversion module (e.g., the first conversion block 120) may receive a first voltage (e.g., 141V) before receiving a power-on signal at a time point of being electrically connected to an AC power source. The conventional first conversion block 120 module may output a second voltage (e.g., 400V) after a time point t2 when the power-on signal is received after being electrically connected to the AC power source.

As illustrated in the second graph g2, the power conversion module 10 according to an embodiment may drive the first conversion block 120 in the fourth mode for a predetermined period of time after being electrically connected to the AC power source. In this case, the first conversion block 120 may output the first voltage V1 (e.g., 400V). As the current consumption of the device circuit 30 increases, the first conversion block 120 may be driven in one of the first to third modes. In this case, the first conversion block 120 may output the second voltage V2 (e.g., 400V).

Accordingly, the power conversion module 10 according to the embodiment may already output a voltage of 400V in the standby mode (e.g., the third mode of the first conversion circuit) before a power-on is requested, leading to quick initialization as compared to the conventional power conversion module.

Figure 6:
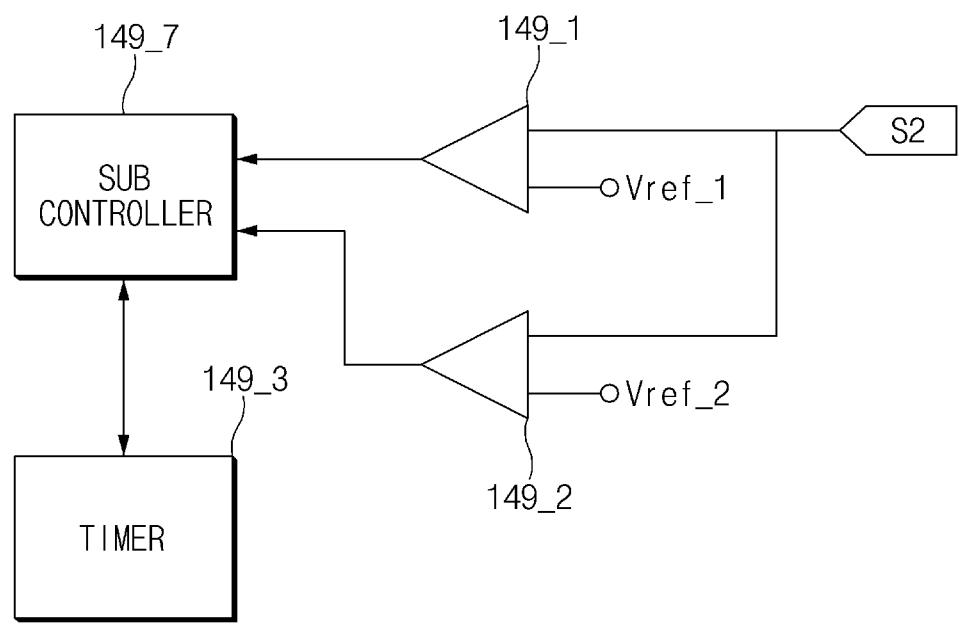
FIG. 6 is a circuit diagram of a second control circuit according to various embodiments.

FIG. 6 is a circuit diagram of a second control circuit according to an embodiment.

Referring to FIG. 6, the second control circuit 149 according to an embodiment may include first and second comparison units 149_1 and 149_2, a timer 149_3, and a sub-controller 149_7. The first and second comparison units 149_1 and 149_2 and the sub-controller 149_7 may be configured as one hardware block or a plurality of hardware blocks.

The first comparison unit 149_1 may compare a first voltage corresponding to a primary output signal of the first conversion block 120 with a specified first reference voltage, and output different signals when the first voltage exceeds the first reference voltage Vref_1 and when the first voltage does not exceed the first reference voltage Vref_1. The first voltage may be output from the second feedback circuit 147. The first reference voltage may be set to determine whether the current consumption of the device circuit 30 exceeds a first threshold.

The second comparison unit 149_2 may compare the first voltage with a second reference voltage Vref_2 and output different signals when the first voltage exceeds the second reference voltage and when the first voltage does not exceed the second reference voltage. The second reference voltage may be set to determine whether the current consumption of the device circuit 30 exceeds a second threshold.

The sub-controller 149_7 may control switching and switching frequencies of the first and second switching elements Q1 and Q2 based on a result of comparison by at least one comparison unit 149_1 and/or 149_2. For example, the sub-controller 149_7 may alternately activate the first and second switching elements Q1 and Q2 when the current consumption exceeds the first threshold as a result of the comparison. In this case, the sub-controller 149_7 may control the first and second switching elements Q1 and Q2 in accordance with a first switching frequency and a first duty ratio. As another example, the sub-controller 149_7 may activate the first switching element Q1 in accordance with a second duty ratio and deactivate the second switching element when the current consumption is less than or equal to the first threshold and exceeds the second threshold.

The sub-controller 149_7 may drive the timer 149_3 when the current consumption is less than or equal to the second threshold. The sub-controller 149_7 may activate the first switching element Q1 in accordance with a third switching frequency and a third duty ratio when a duration for which the current consumption is kept less than or equal to the second threshold is less than a threshold time.

The sub-controller 149_7 may deactivate both the first and second switching elements Q1 and Q2 when the current consumption is less than or equal to the second threshold and the duration for which the current consumption is kept less than or equal to the second threshold is greater than or equal to the threshold time.

The sub-controller 149_7 may initialize the timer 149_3 when the current consumption exceeds the second threshold or the first and second switching elements Q1 and Q2 are deactivated during the measurement of the duration for which the current consumption is kept less than or equal to the second threshold.

Figure 7:
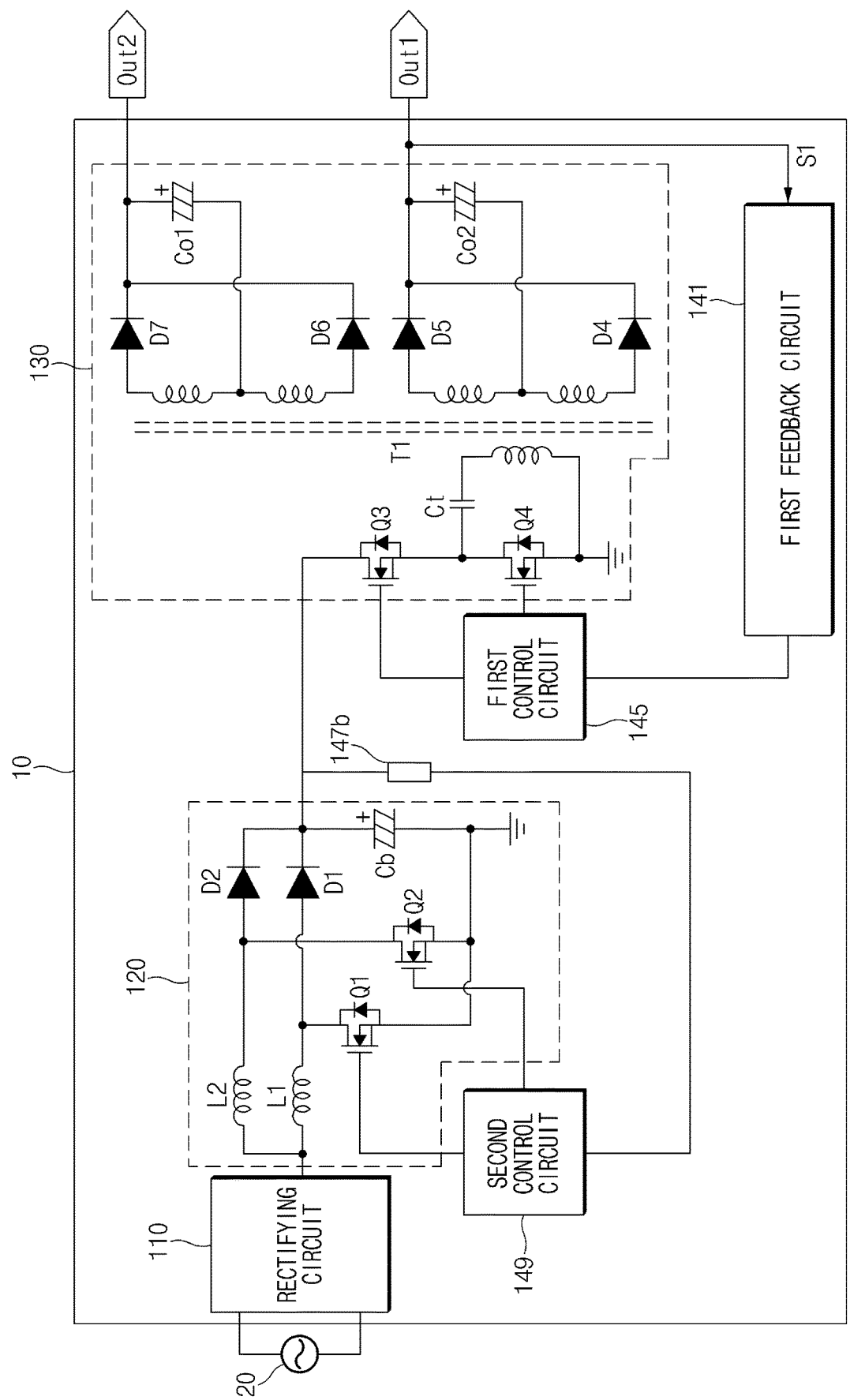
FIG. 7 is a configuration diagram illustrating a power conversion module according to another embodiment.

FIG. 7 is a circuit diagram of another example of a power conversion module according to an embodiment. The power conversion module 10 of FIG. 7 is different from the power conversion module 10 of FIG. 3 in the feedback circuit of the first control circuit 145 and therefore, a description will be given with reference to FIG. 7 with respect to the feedback circuit of the first control circuit 145.

Referring to FIG. 7, the power conversion module 10 according to an embodiment may control a power factor compensation degree by the first conversion block 120 based on an output power of the first conversion block 120. The output power of the first conversion block 120 may correspond to an input power of the second conversion block 130, and the input power of the second conversion block 130 may correspond to the current consumption of the device circuit 30. Therefore, when the second control circuit 149 controls the power factor compensation degree of the first conversion block 120 to correspond to the input power of the second conversion block 130, the power factor compensation degree of the first conversion block 120 may correspond to the current consumption of the device circuit 30.

A feedback circuit 147b may be connected between an output terminal of the first conversion block 120 and an input terminal of the second control circuit 149. The feedback circuit 147b may include a distribution circuit that distributes the output of the first conversion block 120 to a specified magnitude detectable by the second control circuit 149.

The second control circuit 149 may include at least one comparator and compare an output signal of the first conversion block 120 received via the feedback circuit 147b with at least one reference voltage through the at least one comparator to determine a driving mode of the first conversion block 120. The at least one comparator is driven in the same or similar method as the first and second comparison units 149_1 and 149_2 described above and therefore, a detailed description thereof will be omitted. In addition, a process of determining the driving mode of the first conversion block 120 based on the output signal of the first conversion block 120 in the second control circuit 149 is the same as or similar to the configuration described above with reference to FIG. 3 and therefore, a detailed description thereof will be omitted.

Figure 8:
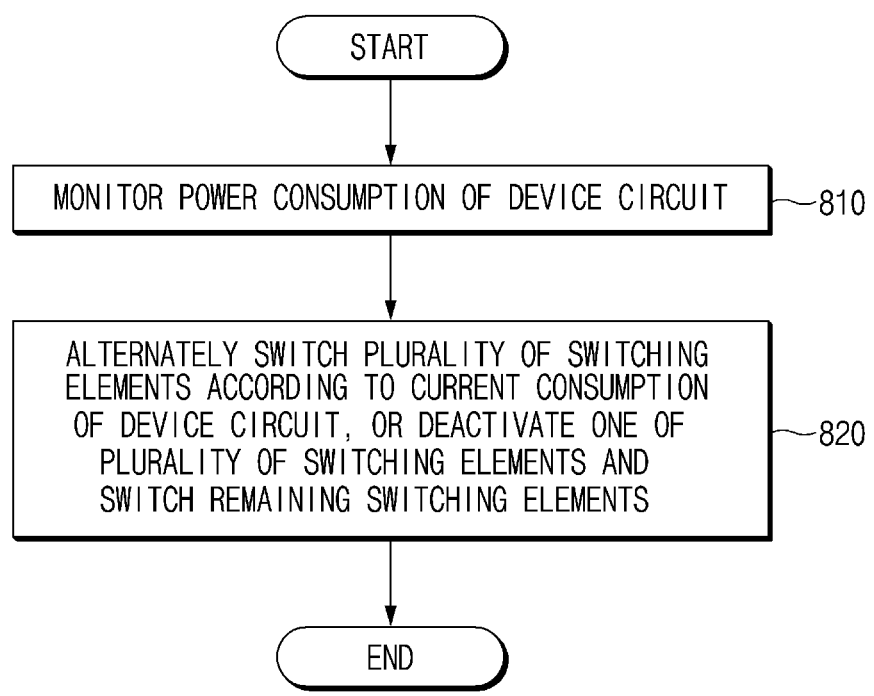
FIG. 8 is a flowchart illustrating a power conversion method according to various embodiments.

FIG. 8 is a flowchart of a power conversion method according to an embodiment.

Referring to FIG. 8, in operation 810, the second control circuit 149 may monitor the current consumption of the device circuit 30.

In operation 820, the second control circuit 149 may alternately switch a plurality of switching elements (e.g., the first and second switching elements Q1 and Q2 of FIG. 3) according to the current consumption of the device circuit 30 or may deactivate one of the plurality of switching elements (e.g., the second switching element Q2 of FIG. 3) and switch the remaining switching element (e.g., the first switching element Q1 of FIG. 3).

Figure 9:
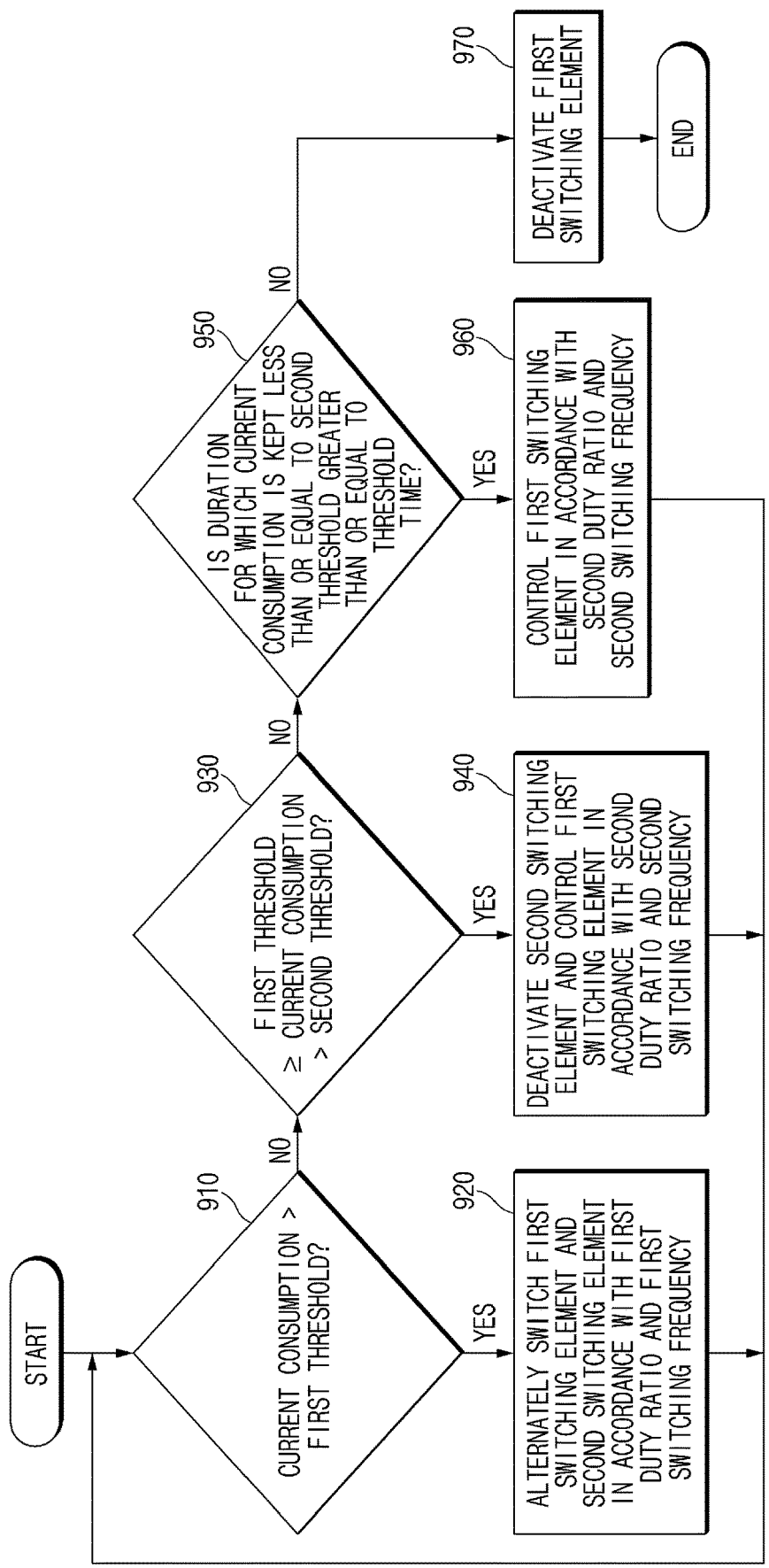
FIG. 9 is a flowchart of a method of adjusting a power factor compensation degree according to an embodiment.

FIG. 9 is a flowchart of a method of adjusting a power factor compensation degree according to an embodiment.

Referring to FIG. 9, in operation 910, the second control circuit 149 may determine whether the current consumption exceeds the first threshold.

When the current consumption exceeds the first threshold, in operation 920, the second control circuit 149 may alternately switch the first switching element Q1 and the second switching element Q2 in accordance with a first duty ratio and a first switching frequency.

When the current consumption is less than or equal to the first threshold, in operation 930, the second control circuit 149 may determine whether the current consumption exceeds the second threshold.

When the current consumption is less than or equal to the first threshold and exceeds the second threshold, in operation 940, the second control circuit 149 may deactivate the second switching element Q2, and switch the first switching element Q1 in accordance with a second duty ratio and a second switching frequency. The second duty ratio may be set to exceed the first duty ratio, for example. The second switching frequency may be equal to the first switching frequency, for example.

When the current consumption is less than or equal to the second threshold, in operation 950, the second control circuit 149 may determine whether a duration for which the current consumption is kept less than or equal to the second threshold is greater than or equal to a threshold time.

When the duration for which the current consumption is kept less than or equal to the second threshold is greater than or equal to the threshold time, in operation 960, the second control circuit 149 may switch the first switching element Q1 in accordance with a third duty ratio and a third switching frequency. The third duty ratio may be less than the first duty ratio, for example. The third switching frequency may be less than the second switching frequency, for example.

When the duration for which the current consumption is kept less than or equal to the second threshold is less than the threshold time, in operation 970, the second control circuit 149 may deactivate the first switching element Q1.

As described above, the second control circuit 149 may continuously control a control mode of the first conversion block 120 based on the input or primary output power of the second conversion block 130 until the supply of an AC power is stopped.

In one embodiment, the second control circuit 149 may control the first to fourth modes of the first conversion block 120 based on the input power or the primary output power of the second conversion block 130.

A power conversion device (e.g., 10 of FIG. 3) may include a rectifying circuit (e.g., 110 of FIG. 3) that fullwave rectifies an input AC power, a first conversion circuit (e.g., 120 of FIG. 3) that includes a passive element (e.g., L1, L2, and Cb of FIG. 3), first and a second switching elements (e.g., Q1 and Q2 of FIG. 3) and digitally converts a rectified power while compensating a power factor of the rectified power through at least one of the passive element, the first switching element, and the second switching element, a second conversion circuit (e.g., 130 of FIG. 3) that converts the digitally-converted power into a power with a specified magnitude and output the power with the specified magnitude, a device circuit (e.g., 30 of FIG. 1) that consumes an output power of the second conversion circuit, a first control circuit (e.g., 145 of FIG. 3) that monitors current consumption of the device circuit and controls an amount of output current of the second conversion circuit based on the current consumption of the device circuit, and a second control circuit (e.g., 149 of FIG. 3) that controls a power factor compensation degree of the first conversion circuit based on the current consumption, wherein the second control circuit may alternately activate the first and second switching elements according to the current consumption or deactivate the second switching element and switch the first switching element.

The second control circuit may identify the current consumption of the device circuit based on at least one of an input of the second conversion circuit and a primary output of the second conversion circuit.

The second control circuit may further control at least one of a number of activated switching elements of the first and second switching elements, a switching frequency of the activated switching element, or a duty ratio of the activated switching element, based on the current consumption.

The second control circuit may alternately activate the first and second switching elements when the current consumption meets a first condition, and deactivate the second switching element and switch the first switching element when the current consumption meets a second condition that is a current condition relatively lower than the first condition.

The second control circuit may include a comparison unit (e.g., 149_1 and 149_2 of FIG. 6) that compares a first signal corresponding to the current consumption with a reference signal corresponding to the first condition and outputs different signals according to a comparison result, and a sub-controller (e.g., 149_7 of FIG. 6) that controls activation of at least one of the first and second switching elements based on the comparison result of the comparison unit.

The second control circuit may determine whether the current consumption meets a third condition that is a current condition relatively lower than the second condition, and decrease at least one of a switching frequency and a duty ratio of the first switching element when the current consumption meets the third condition rather than when the current consumption meets the second condition.

The second control circuit may include a comparison unit that compares a first signal corresponding to the current consumption with a reference signal corresponding to the second condition and outputs different signals according to a comparison result, and a sub-controller that decreases an activation time of the first switching element by decreasing at least one of the switching frequency and the duty ratio of the first switching element based on the comparison result of the comparison unit.

The second control circuit may deactivate the first and second switching elements when the current consumption meets a third condition that is a current condition relatively lower than the second condition.

The second control circuit may include a timer (e.g., 149_3 of FIG. 6) and the second control circuit may measure a duration for which the third condition is met by driving the timer when the current consumption meets the third condition, and deactivate the first and second switching elements when the measured duration is greater than or equal to a threshold time.

The passive element may include first and second inductors (e.g., L1 and L2 of FIG. 3) that receive the rectified power respectively, first and second diodes (e.g., D1 and D2 of FIG. 3) connected to output terminals of the first and second inductors respectively, and a smoothing circuit (e.g., Qb of FIG. 3) that smooths a power passed through the first and second diodes, wherein the first switching element may be repeatedly activated and deactivated between the first inductor and the first diode to compensate a power factor for an output of the first inductor through adjustment of an amount of current applied to the first inductor, wherein the second switching element may be repeatedly activated and deactivated between the second inductor and the second diode to compensate a power factor for an output of the second inductor through adjustment of an amount of current applied to the second inductor, and wherein activation periods of the first and second switching elements may be set not to overlap each other by 50% or more.

The second control circuit may control the first and second switching elements such that switching frequencies of the first and second switching elements are out of an audible frequency band.

The second conversion circuit may include at least one another switching element (e.g., Q3 and Q4 of FIG. 3) that outputs or blocks a signal corresponding to the digitally-converted power, a transformer (e.g., T1 of FIG. 3) that steps down and output a power passed through the at least one another switching element, a capacitor (e.g., Ct of FIG. 3) that blocks zero current in conjunction with the transformer when the another switching element is turned on or off, and a rectifying unit (e.g., D4, D5, D6, D7, Co1, and Co2 of FIG. 3) that rectifies an output power of the transformer.

According to an embodiment, an electronic device may include the power conversion device (e.g., 10 of FIG. 1), wherein the device circuit may include a plurality of light emitting devices (LEDs) (e.g., 320 of FIG. 1), and a processor (e.g., 320 of FIG. 1) that controls activation and deactivation of the plurality of LEDs, wherein the power conversion device compensates a power factor using at least one of the passive element and the first switching element in a mode in which the plurality of LEDs are deactivated.

A power conversion method by at least one processor may include monitoring current consumption of a device circuit that consumes a power generated by digitally converting an AC power when the power is applied, and controlling a power factor compensation degree of a power factor compensation circuit that compensates a power factor for the AC power according to the monitored current consumption, wherein the controlling of the power factor compensation degree may alternately activating a plurality of switching elements included in the power factor compensation circuit according to the current consumption or deactivating one of the plurality of switching elements and switching remaining switching elements.

The controlling of the power factor compensation degree may include controlling at least one of a number of activated switching elements of the plurality of switching elements, a switching frequency of the activated switching element, and a duty ratio of the activated switching element.

The term "module" used in the disclosure may include, for example, a unit implemented with one or more combinations of hardware, software and firmware. The term "module" may be interchangeably used with the terms "unit", "logic", "logical block", "part" and "circuit". The module may be a minimum unit of an integrated part or may be a part thereof. For example, according to one embodiment, the module may be implemented in the form of an application-specific integrated circuit (ASIC).

At least a part of an apparatus (e.g., modules or functions thereof) or a method (e.g., operations) according to various embodiments may be, for example, implemented by instructions stored in a computer-readable storage media in the form of a program module. The instruction, when executed by a processor, may cause the one or more processors to perform a function corresponding to the instruction. A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an internal memory, or the like. The instruction may contain a code made by a compiler or a code executable by an interpreter. A module or a program module according to various embodiments may include at least one of the above components, or a part of the above components may be omitted, or additional other components may be further included.

Operations performed by a module, a program module, or other components according to various embodiments may be executed sequentially, in parallel, repeatedly, or in a heuristic method. In addition, some operations may be executed in different sequences or may be omitted. Alternatively, other operations may be added. The embodiments disclosed herein are presented for the purpose of description and understanding of the technical content disclosed, and do not limit the scope of the technology described in the disclosure. Accordingly, the scope of the disclosure should be construed as including all changes or various other embodiments based on the technical spirit of the disclosure.

The invention claimed is:

1. A power conversion device comprising:
   a rectifying circuit configured to full-wave rectify an input AC power;
   a first conversion circuit including a passive element, a first switching element, and a second switching element and configured to digitally convert a rectified power while compensating a power factor of the rectified power through at least one of the passive element, the first switching element, and the second switching element;
   a second conversion circuit configured to convert the digitally-converted power into a power with a specified magnitude and output the power with the specified magnitude;
   a device circuit configured to consume the power with the specified magnitude;
   a first control circuit configured to monitor current consumption of the device circuit and control an amount of output current of the second conversion circuit based on the current consumption of the device circuit; and
   a second control circuit configured to control a power factor compensation degree of the first conversion circuit based on the current consumption,
   wherein the second control circuit is configured to:
   based on the current consumption exceeding a first threshold, alternately activate the first and second switching elements,
   based on the current consumption being less than or equal to the first threshold and exceeding a second threshold, deactivate the second switching element and switch the first switching element,
   based on a duration for which the current consumption is kept less than or equal to the second threshold being less than a threshold time, decrease activation time of the first switching element, and
   based on the duration for which the current consumption is kept less than or equal to the second threshold being greater than the threshold time, deactivate the first switching element.

2. The power conversion device of claim 1, wherein the second control circuit is configured to identify the current consumption of the device circuit based on at least one of an input of the second conversion circuit or a primary output of the second conversion circuit.

3. The power conversion device of claim 1, wherein the second control circuit includes:
   a comparator configured to compare a first signal corresponding to the current consumption with a reference signal corresponding to the first threshold and output different signals according to a comparison result; and
   a sub-controller configured to control activation of the first switching element based on the comparison result.

4. The power conversion device of claim 1, wherein the second control circuit includes:
   a comparator configured to compare a first signal corresponding to the current consumption with a reference signal corresponding to the second threshold and output different signals according to a comparison result; and
   a sub-controller configured to decrease the activation time of the first switching element by decreasing at least one of switching frequency or duty ratio of the first switching element based on the comparison result.

5. The power conversion device of claim 1, wherein the second control circuit includes a timer, and
wherein the second control circuit is configured to measure the duration for which the current consumption is kept less than or equal to the second threshold by driving the timer when the current consumption is less than or equal to the second threshold.

6. The power conversion device of claim 1, wherein the passive element includes:
first and second inductors configured to receive the rectified power respectively;
first and second diodes connected to output terminals of the first and second inductors respectively; and
a smoothing circuit configured to smooth a power passed through the first and second diodes,
wherein the first switching element is configured to be repeatedly activated and deactivated between the first inductor and the first diode to compensate a first power factor for an output of the first inductor through adjustment of an amount of current applied to the first inductor, and
wherein the second switching element is configured to be repeatedly activated and deactivated between the second inductor and the second diode to compensate a second power factor for an output of the second inductor through adjustment of an amount of current applied to the second inductor,
wherein activation periods of the first and second switching elements are set not to overlap each other by 50% or more.

7. The power conversion device of claim 1, wherein the second control circuit is configured to:
control the first and second switching elements such that switching frequencies of the first and second switching elements are out of an audible frequency band.

8. The power conversion device of claim 1, wherein the second conversion circuit includes:
at least one another switching element configured to output or block a signal corresponding to the digitally-converted power;
a transformer configured to step down and output a power passed through the at least one another switching element;
a capacitor configured to block zero current in conjunction with the transformer when the another switching element is turned on or off; and
a rectifying unit configured to rectify an output power of the transformer.

9. An electronic device comprising:
the power conversion device of claim 1,
wherein the device circuit includes
a plurality of light emitting devices (LEDs); and
a processor configured to control activation and deactivation of the plurality of LEDs,
wherein the power conversion device is configured to compensate the power factor using at least one of the passive element or the first switching element in a mode in which the plurality of LEDs are deactivated.

10. A power conversion method by at least one processor, comprising:
monitoring current consumption of a device circuit that consumes a power generated by digitally converting an AC power when the power is applied; and
controlling a power factor compensation degree of a power factor compensation circuit that compensates a power factor for the AC power according to the monitored current consumption,
wherein the controlling of the power factor compensation degree includes
based on the current consumption exceeding a first threshold, alternately activating a plurality of switching elements included in the power factor compensation circuit,
based on the current consumption being less than or equal to the first threshold and exceeding a second threshold, deactivating one of the plurality of switching elements and switching remaining switching elements,
based on a duration for which the current consumption is kept less than or equal to the second threshold being less than a threshold time, decreasing activation time of the remaining switching elements, and
based on the duration for which the current consumption is kept less than or equal to the second threshold being greater than the threshold time, deactivating the remaining switching elements.

11. The power conversion method of claim 10, wherein the controlling of the power factor compensation degree further includes controlling at least one of a switching frequency or a duty ratio of the remaining switching elements.

* * * * *